(12) United States Patent
Hermans et al.

(10) Patent No.: US 8,152,129 B2
(45) Date of Patent: Apr. 10, 2012

(54) PLINTHS CONSTRUCTED OF PLASTIC MATERIAL

(76) Inventors: Ty Gerard Hermans, Clontarf (AU); Mark Petrie, Brisbane (AU)

( * ) Notice: Subject to any disclaimer, the term of this patent is extended or adjusted under 35 U.S.C. 154(b) by 16 days.

(21) Appl. No.: 12/733,356

(22) PCT Filed: Aug. 29, 2008

(86) PCT No.: PCT/AU2008/001263
§ 371 (c)(1), (2), (4) Date: Feb. 23, 2010

(87) PCT Pub. No.: WO2009/026632
PCT Pub. Date: Mar. 5, 2009

(65) Prior Publication Data
US 2010/0207004 A1    Aug. 19, 2010

(30) Foreign Application Priority Data
Aug. 30, 2007   (AU) ................... 2007214332

(51) Int. Cl.
*F16M 3/00*   (2006.01)
(52) U.S. Cl. ................... 248/678; 248/346.01
(58) Field of Classification Search ............... 248/676, 248/678, 346.01, 346.02
See application file for complete search history.

(56) References Cited

U.S. PATENT DOCUMENTS

| | | | |
|---|---|---|---|
| 2,544,743 A | 3/1951 | Vrabcak | |
| 3,790,115 A | 2/1974 | Fox et al. | |
| 3,826,455 A * | 7/1974 | O'Donnell | 248/97 |
| 4,050,659 A * | 9/1977 | McCannon et al. | 248/636 |
| 4,936,117 A * | 6/1990 | Kabeya | 68/3 R |
| 5,664,394 A | 9/1997 | Sweeney | |
| 5,961,093 A | 10/1999 | Jones et al. | |
| 6,044,592 A | 4/2000 | Strieter | |
| 6,923,419 B2 * | 8/2005 | George et al. | 248/676 |
| 7,021,599 B2 * | 4/2006 | DeGrazia et al. | 248/645 |
| 7,780,140 B1 * | 8/2010 | Ward et al. | 248/678 |
| 7,891,635 B2 | 2/2011 | Rowland | |
| 7,921,679 B2 * | 4/2011 | Jo | 68/3 R |
| 2005/0040308 A1 | 2/2005 | Sweeney et al. | |

FOREIGN PATENT DOCUMENTS

| | | |
|---|---|---|
| AU | 148328 S | 7/2002 |
| AU | 2006/100199 A4 | 4/2006 |
| WO | WO 03/064239 A1 | 8/2003 |
| WO | 2007/068036 A1 | 6/2007 |

OTHER PUBLICATIONS

International Search Report, Jan. 16, 2009.
PCT International Preliminary Report on Patentability for PCT/AU2008/001263 issued on Mar. 2, 2010.
EPO Supplementary European Search Report for EP Application No. 08 78 3011 completed on Jan. 11, 2011.
EPO Search Opinion for EP Application No. 08 78 3011 issued on Jan. 18, 2011.

* cited by examiner

*Primary Examiner* — Ramon Ramirez
(74) *Attorney, Agent, or Firm* — Abelman Frayne & Schwab

(57) ABSTRACT

A plinth constructed of plastics material including a platform; a continuous side wall depending from said platform and adapted to rest on the ground, said side wall including one or more peripheral portions and one or more divider portions, each of said one or more divider portions dividing the platform into at least two load bearing sections and each divider portion including two spaced apart divider wall portions joined by a bottom wall adapted to rest on the ground so as to support the adjacent load bearing sections of said platform, said platform, said divider wall portions and said bottom wall providing a continuous top face.

12 Claims, 8 Drawing Sheets

SECTION A

SECTION B

PLINTHS CONSTRUCTED OF PLASTIC MATERIAL

CROSS REFERENCE TO RELATED APPLICATIONS

This application is a national phase of PCT application No. PCT/AU2008/001263, filed Aug. 29, 2008, which claims priority to AU provisional patent application No. 2007214332, filed Aug. 30, 2007, all of which are incorporated herein by reference.

This invention relates to plinths in particular, to plinths constructed of plastics materials.

Installations such as air conditioners, storage water heaters, water filter apparatus and the like have one or more units that need to be supported on a plinth or the like to lessen the likelihood of damage from water run off and to minimise corrosion. Commonly, such units are situated outdoors and are placed on relatively heavy, concrete plinths to support them off the ground. Generally, concrete plinths are heavy, awkward to carry and tend to have some rough edges that can cause damage to vehicles transporting them and/or to persons carrying them. Such problems have been ameliorated by the use of plinths made from plastics materials. However, the presently available plinths moulded from plastics materials are more expensive to produce than desired.

One object of the present invention is to provide a plinth constructed of plastics material which ameliorates the aforementioned problem. Another object is to provide a plinth which will be reliable and efficient in use.

With the foregoing in view, the present invention in one aspect resides broadly in a plinth constructed of plastics material including:

a platform;

a continuous side wall depending from said platform and adapted to rest on the ground, said side wall including one or more peripheral portions and one or more divider portions, each of said one or more divider portions dividing the platform into at least two load bearing sections and each divider portion including two spaced apart divider wall portions joined by a bottom wall adapted to rest on the ground so as to support the adjacent load bearing sections of said platform, said platform, said divider wall portions and said bottom wall providing a continuous upper face.

Preferably, each of said load bearing sections has at least one elongate support member extending thereacross and depending from said platform. In such form it is preferred that the elongate support members are connected to said peripheral wall portion at one end and to one of said divider wall portions at the other end. It is also preferred that said elongate support members be integral with said platform and said peripheral side wall and the respective divider wall portion. Preferably, the array density of said elongate support members between said divider wall portions and said peripheral wall portion is greater than the array density elsewhere.

Preferably, said bottom wall has a substantially planar lower surface thereby providing a suitable load transferring surface area for resting on the ground.

Preferably, said peripheral side wall terminates in an outwardly extending continuous flange having an upper surface and a lower surface, the flange being contiguous with said bottom wall and the lower surface being coplanar with the lower surface of said bottom wall.

Preferably, the plinth is constructed such that like plinths are nestable. To that end, it is preferred that said continuous side wall diverges away from said platform and that said elongate support members depend from said platform only part way to said bottom wall.

In another aspect, the invention resides broadly in a plinth constructed of plastics material including:

a platform having at least one peripheral corner; a continuous side wall depending from said platform and terminating in a flange having a peripheral edge spaced from said side wall and a bottom face adapted to rest on the ground to support the platform, the portion of said side wall adjacent said at least one peripheral corner joining said flange adjacent its peripheral edge.

Preferably, at least a portion of said side wall adjacent said at least one peripheral corner is curved. In such form, it is preferred that a portion of said curved portion of said side wall is concentric with the edge of said flange to which it is adjacent. It is also preferred that the portion of said side wall adjacent said at least one peripheral edge includes an elongate corner portion joining said platform and a conical portion joining said flange and in such form it is preferred that said elongate corner portion extends over about half the height of the side wall.

In yet another aspect, the invention resides broadly in a plinth constructed of plastics material including:

a platform having at least one peripheral corner;

a continuous side wall depending from said platform and terminating in a flange having peripheral edge spaced from said side wall by a predetermined distance and a bottom face adapted to rest on the ground to support the platform, the predetermined distance, adjacent said at least one peripheral corner being less than the predetermined distance remote from said peripheral corner.

In order that the invention may be more easily understood and put into practical effect, reference will now be made to the accompanying drawings wherein.

Figure 1:
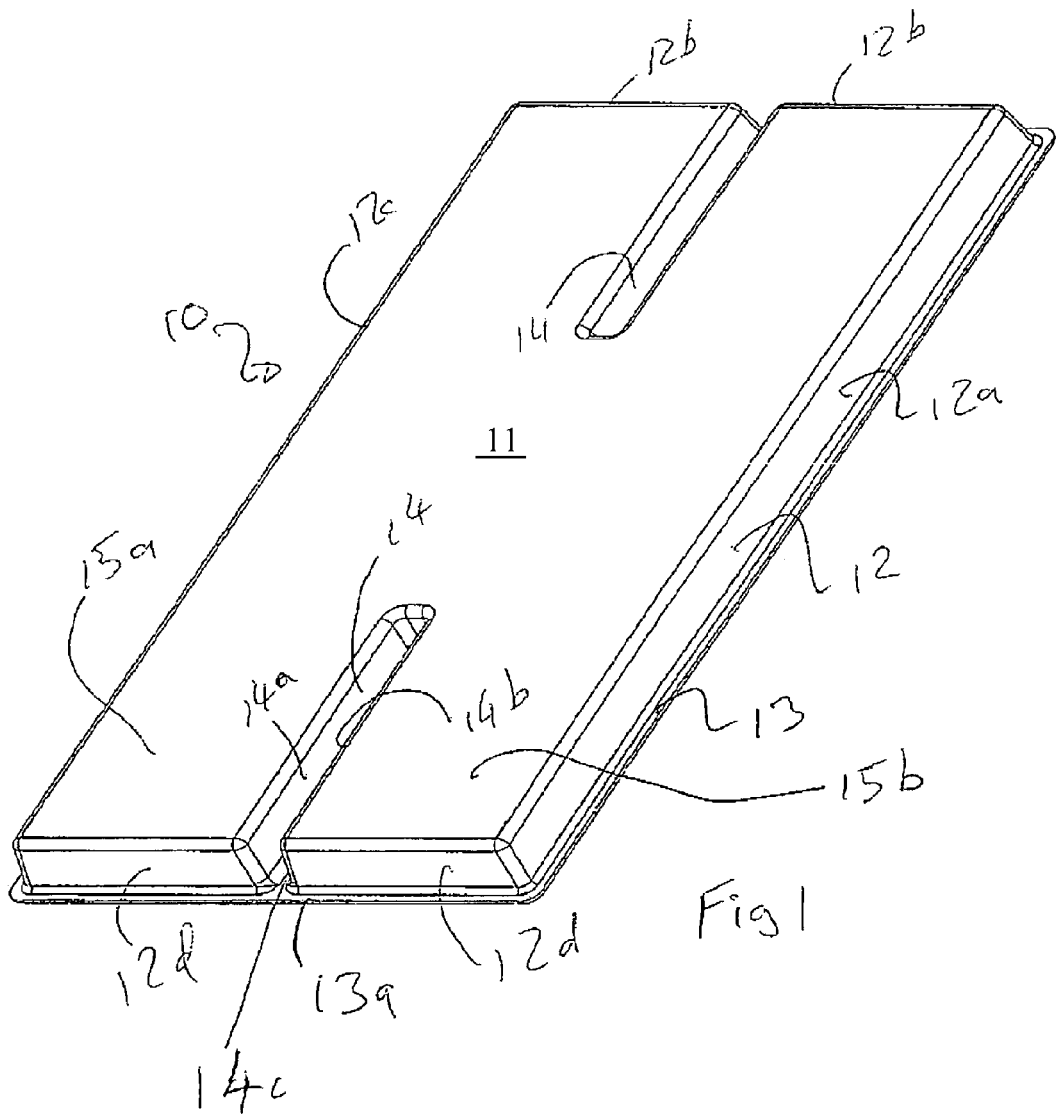
FIG. 1 is an isometric view of a plinth according to the invention from above top.

The plinth 10 illustrated in FIG. 1 is generally rectangular in shape and is integrally molded from high density polyethylene (HDPE). The plinth includes a platform 11 having a continuous side wall 12 depending from and diverging away from the platform and terminating in an outwardly extending continuous flange 13 having an upper surface 13a and a lower surface 13b.

The side wall 12 is made up of opposed longer sided peripheral wall portions 12a and 12c and opposed shorter sided peripheral wall portions 12b and 12d extending between the longer sided wall portions at their respective ends.

In addition, the side wall 12 is also made up of a pair of elongate divider portions 14, each divider portion being made up of a pair of opposed spaced apart divider wall portions 14a and 14b joined by a bottom wall 14c, each divider wall portion extending in from an end wall portion.

Each divider portion is straight and divides the platform into two load bearing sections 15a and 15b either side of the divider portion and the bottom wall is adapted to rest on the ground so as to support the adjacent load bearing sections of said platform.

The platform, divider wall portions, the bottom walls and the flange provide a continuous upper surface which seals on the ground (or other foundation surface) by the flange to inhibit ingress of vermin.

Figure 2:
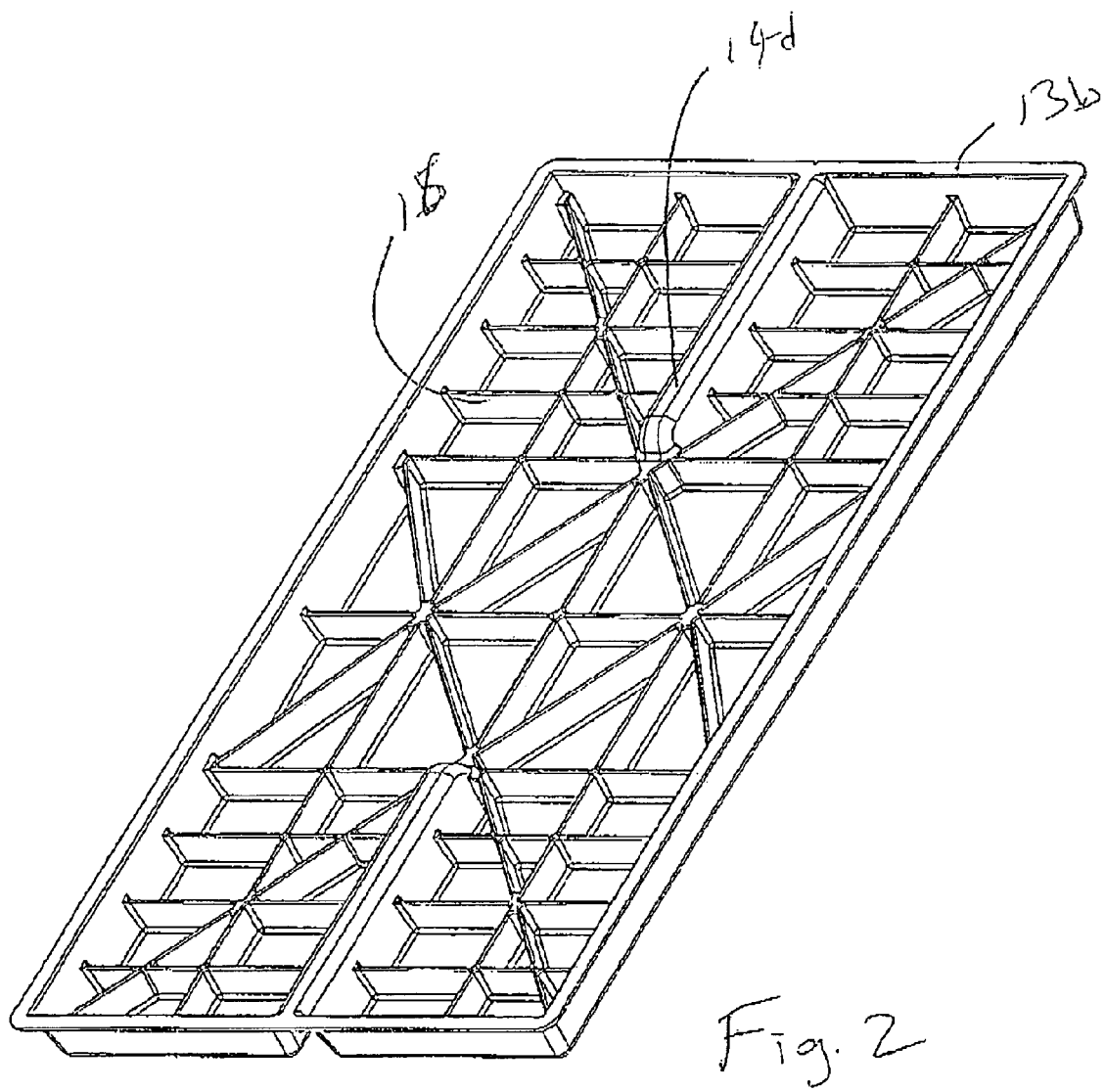
FIG. 2 is an isometric view of the plinth of FIG. 1 from below.

An array of integrally formed elongate support members 16 as shown in FIG. 2, for substantially half the height of the sidewall defining an underlying support structure for the platform 11. Several of the elongate support members are connected to the longest peripheral wall portion at one end and to the divider wall portions at the other end. Coaxial elongate support members are connected in the same way on the opposite divider wall portion. The members 16 assist in allowing the plinths to be nested.

The bottom wall 14c has a substantially planar lower surface 14d and the flange 13 is contiguous with the bottom wall with its lower surface 13b being coplanar with the lower surface 14d of the bottom wall thereby providing a suitable load transferring surface area for resting on the ground.

The array density of the elongate support members is greater on either side of the longitudinal axis of the divider wall portions than the array density elsewhere as can be seen in FIG. 2, the load bearing portions 15a and 15b being the portions where the feet of an air conditioning unit engage the platform.

Advantageously, the inventor enables less HDPE to be used to achieve the necessary rigidity with a resulting cost saving in raw materials.

Figure 3:
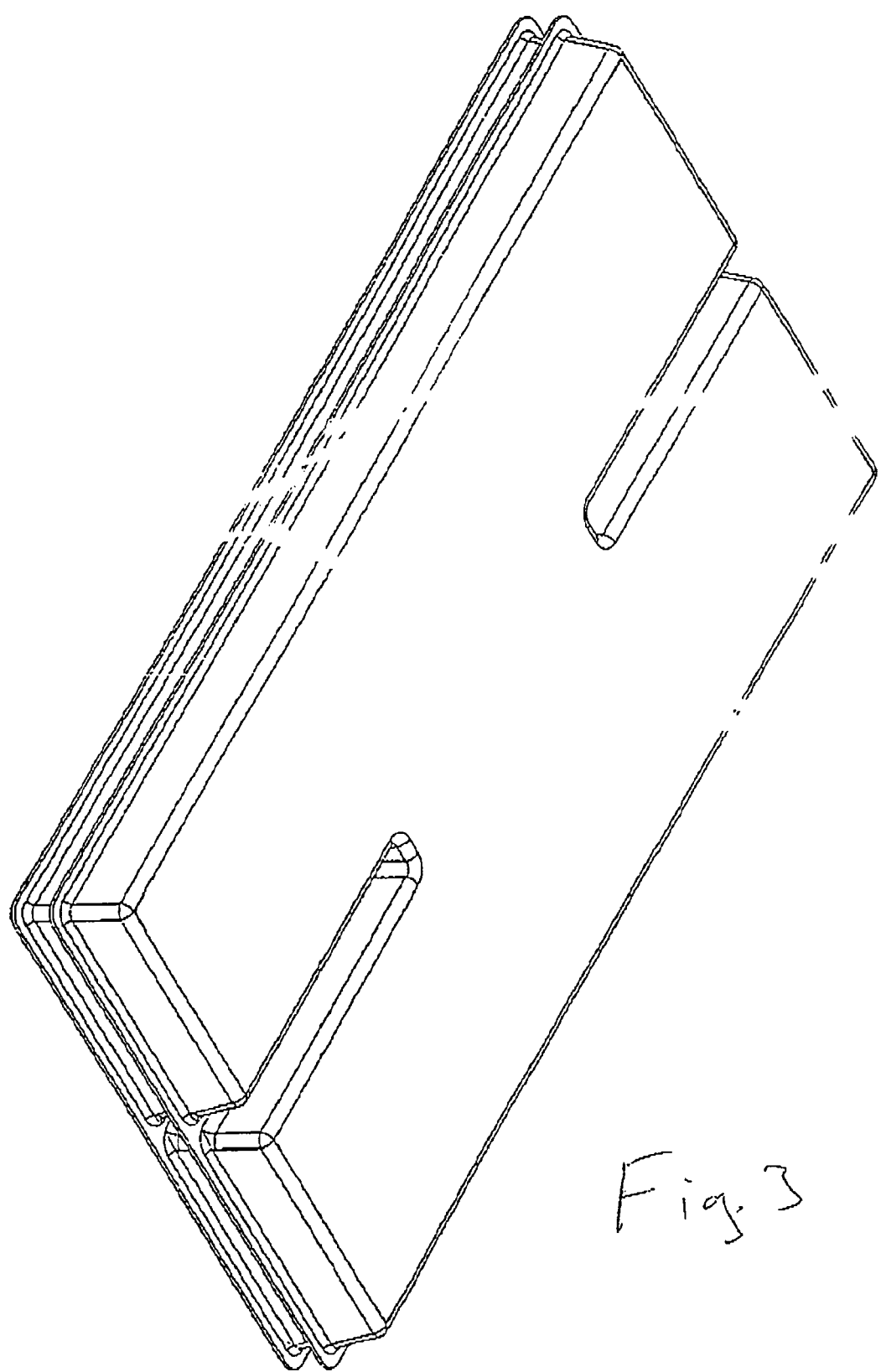
FIG. 3 is an isometric view of two nested plinths of the type illustrated in FIG. 1.

It will be appreciated from FIG. 3 at least that the diverging sidewall together with the height of the elongate support members enables similar plinths to be nestable to a depth approximately half the height of the side wall 12.

Figure 4:
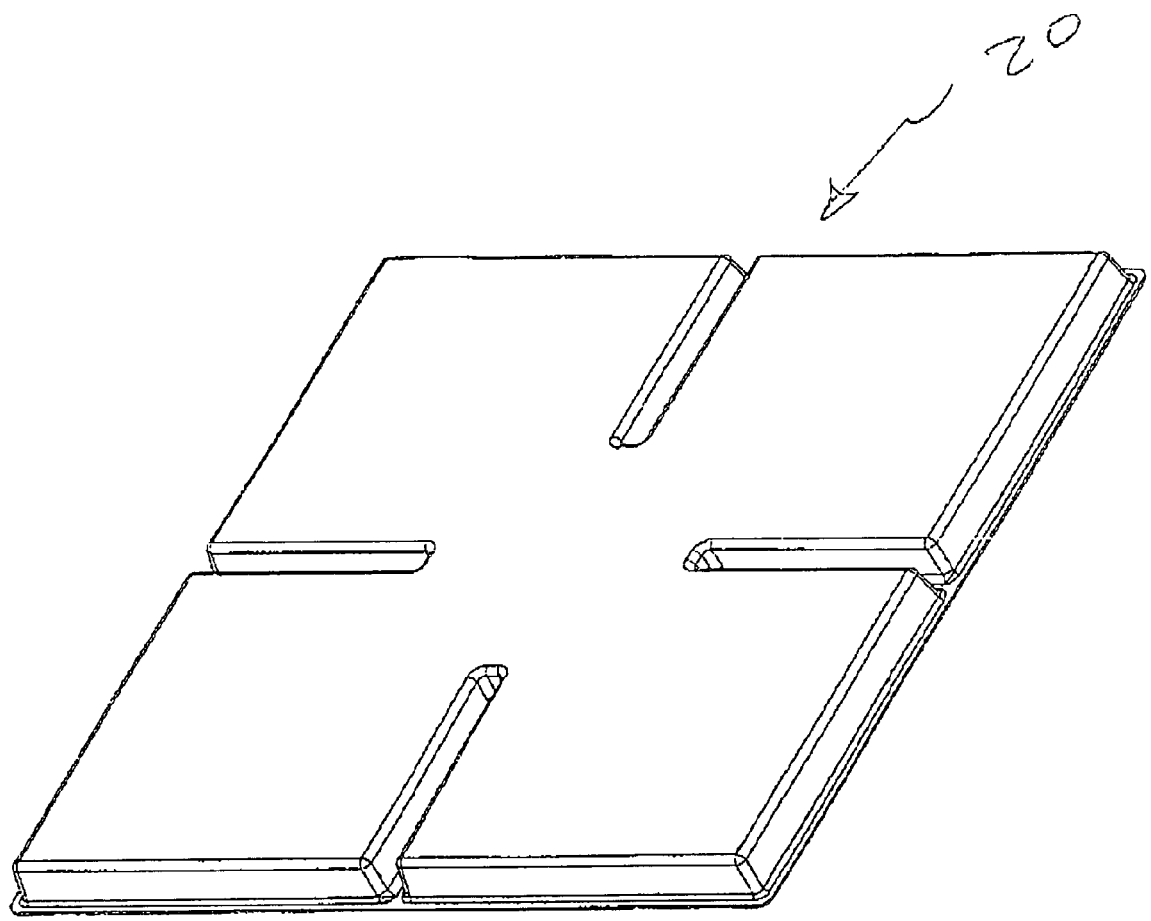
FIG. 4 is an isometric view of another plinth according to the invention from above.
Figure 5:
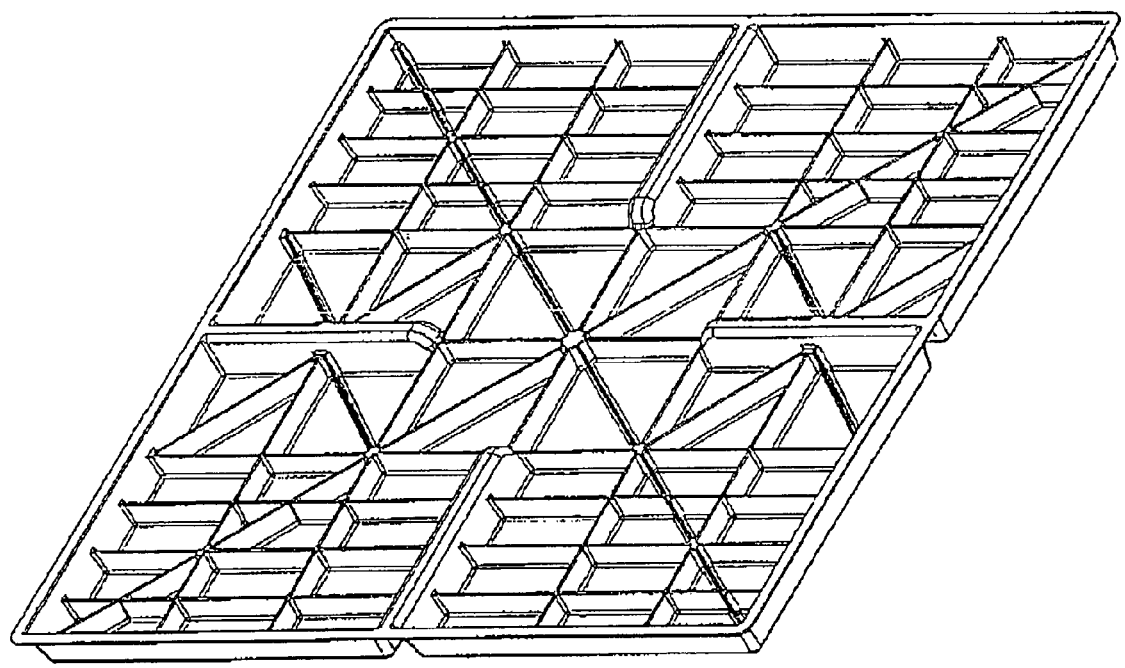
FIG. 5 is an isometric view of the plinth of FIG. 4 from below.

The plinth 20 illustrated in FIG. 4 is similar to the rectangular plinth described above in many respects, the main difference being instead of having one pair of coaxial divider wall portions, it has two coaxial pairs, each pair being coaxial and orthogonal to the other pair. As can be more clearly seen in FIG. 5, the underside array density of elongate support members is slightly different from that of the rectangular plinth. The central portion of the plinth defined by elongate support members that extend either side of the ends of the divider wall portions each intersect to form a central square region that possesses the lowest array density of the plinth. Whereas similarly sized square regions at each corner of the underside of the platform possess the highest array density whilst the remaining square regions possess an intermediate density. Advantageously, the plinth 20, is suitable for use with circular or square based hot water storage tanks.

The plinth 30 illustrated in FIGS. 6 to 12 show another embodiment of the invention where a conical portion of the side wall 31 adjacent each peripheral corner joins the flange adjacent its peripheral edge. The side wall portion 31 is concentric with the edge of the flange to which it is adjacent. The side wall 33 adjacent the peripheral corner 32 includes an elongate corner portion that joins the platform and the conical portion. The conical portion goes on to join the flange. The elongate corner portion extends over about the top half of the height of the side wall and the conical portion extends over about the bottom half the height of the side wall. Advantageously, the height of the elongate support members coincide with the height of the elongate corner portion.

Figures 8, 10:
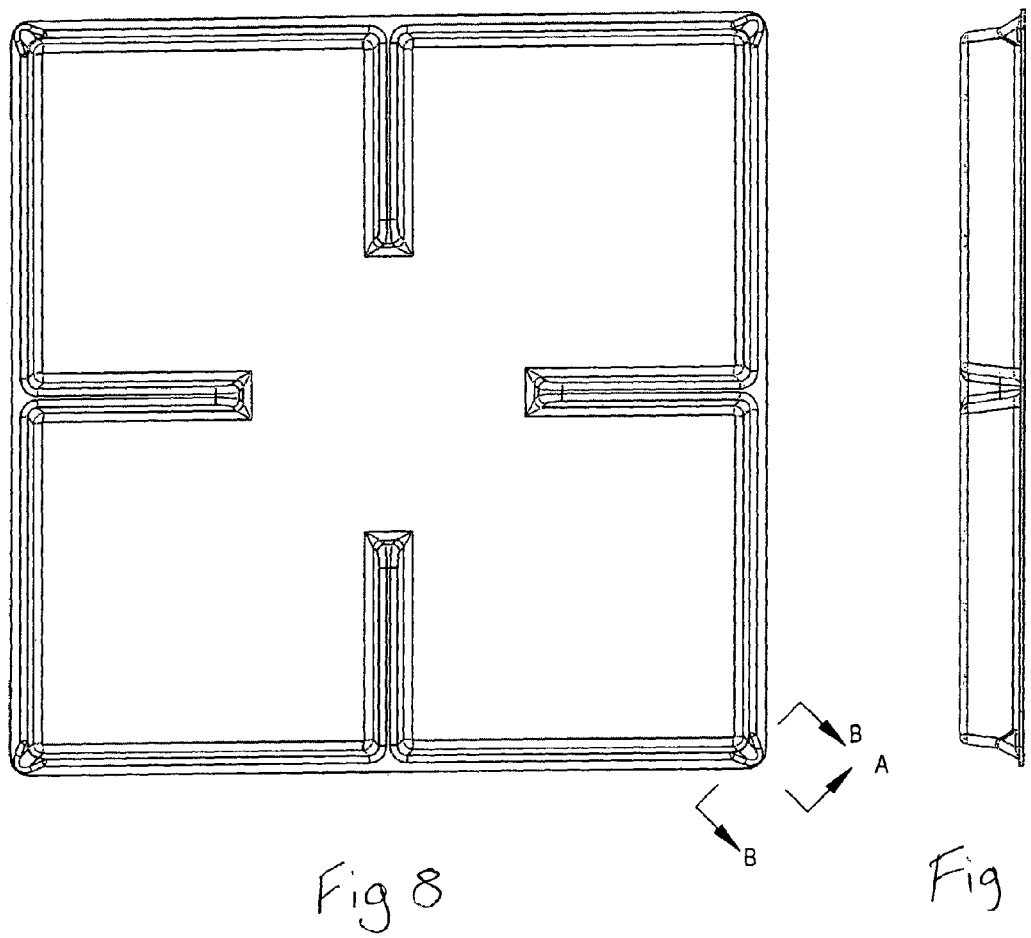
FIG. 8 is a plan of the plinth of FIG. 6.
FIG. 10 is an end elevation of the plinth of FIG. 6.
Figure 9:
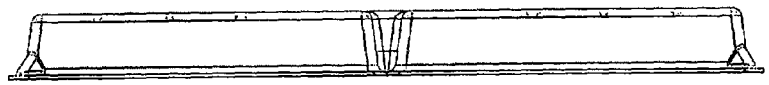
FIG. 9 is a front elevation of the plinth of FIG. 6.
Figure 11:
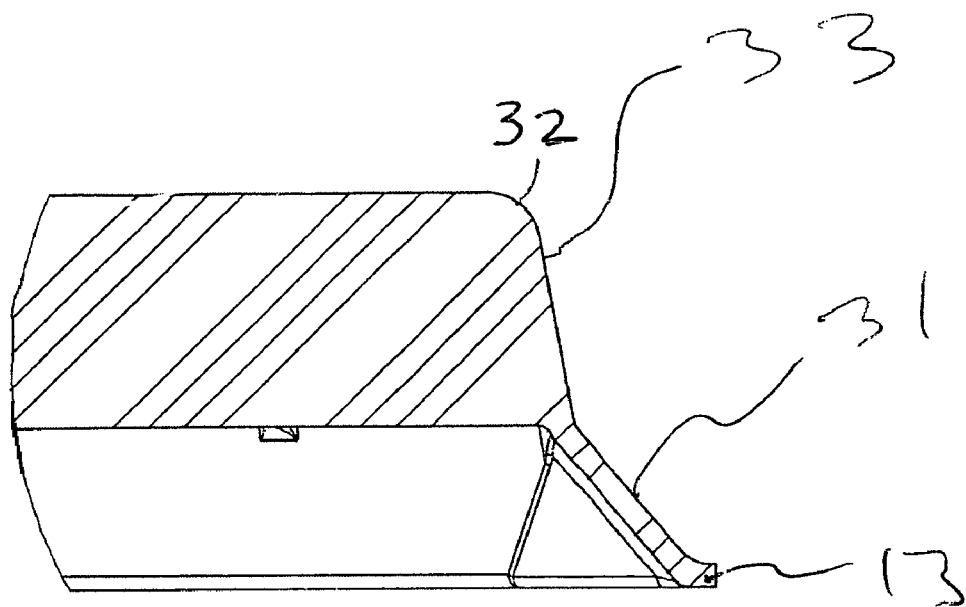
FIG. 11 is a sectional elevation of a corner portion of the plinth of FIG. 6 along line A-A.
Figure 12:
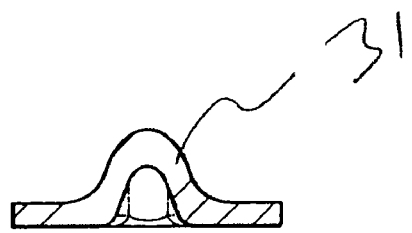
FIG. 12 is a sectional elevation of a corner portion of the plinth of FIG. 6 along line B-B.

As shown in FIG. 8 the flange has a peripheral edge spaced from the side wall and the portion of the side wall adjacent each peripheral corner joins the flange adjacent its peripheral edge.

Figure 6:
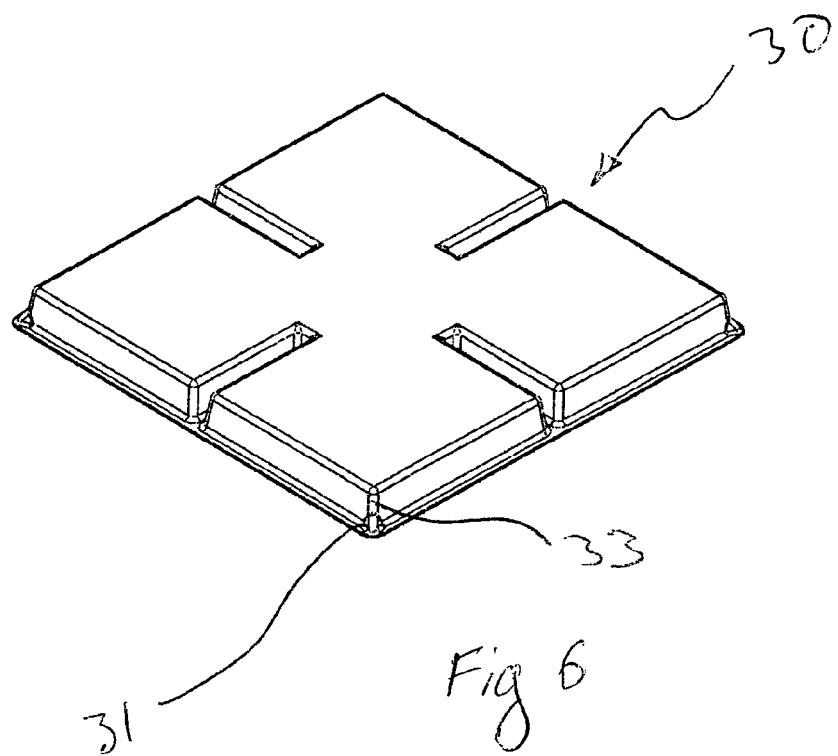
FIG. 6 is an isometric view of another plinth according to the invention from above.
Figure 7:
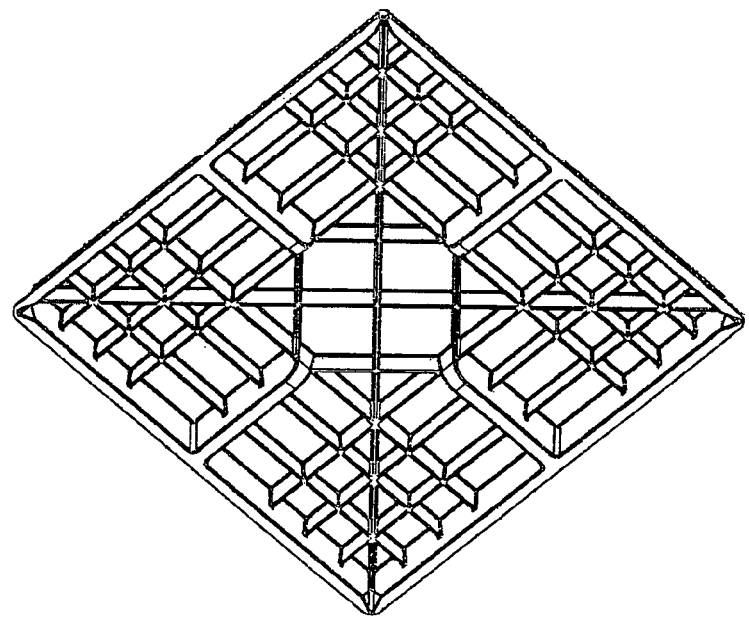
FIG. 7 is an isometric view of the plinth of FIG. 6 from below.

It will be appreciated that an un-illustrated alternative embodiment to the type of plinth in FIG. 6 need not have the divider portions.

It will of course be realised that the above has been given by way of illustrative embodiment of the invention, all such modifications and variations thereto as would be apparent to persons skilled in the art are deemed to fall within the broad scope and ambit of the invention as is defined in the appended claims.

The invention claimed is:

1. A plinth constructed of plastics material including:
   a platform;
   a continuous side wall depending from said platform and adapted to rest on the ground, said side wall including one or more peripheral portions and one or more divider portions, each of said one or more divider portions dividing the platform into at least two load bearing sections and each divider portion including two spaced apart divider wall portions joined by a bottom wall adapted to rest on the ground so as to support the adjacent load bearing sections of said platform, said platform, said divider wall portions and said bottom wall providing a continuous upper face.

2. A plinth according to claim 1, wherein each of said load bearing sections has at least one elongate support member depending from said platform and extending thereacross.

3. A plinth according to claim 2, wherein each elongate support member is connected to said peripheral wall portion at one end and to one of said divider wall portions at the other end.

4. A plinth according to claim 3, wherein each elongate support member is integral with said platform and said peripheral side wall and the divider wall portion to which it is connected.

5. A plinth according to claim 4, wherein said at least one elongate support member includes an array of elongate support members and the density of said array of elongate support members between said divider wall portions and said peripheral wall portion is greater than the density remote from said divider wall portions.

6. A plinth according to claim 5, wherein the bottom wall of said one or more divider portions has a substantially planar lower face.

7. A plinth according to claim 6, wherein the one or more peripheral portions of said side walls terminate in an outwardly extending continuous flange having an upper face and a lower face, the flange being contiguous with the bottom wall of said one or more divider portions and the lower face of the flange being co-planar with the lower face of the bottom wall of said one or more divider portions.

8. A plinth as claimed in claim 7, wherein said continuous side wall diverges away from said platform and said elongate support members depend from the platform for about half the height of said side wall so that like plinths are nestable for about half their height.

9. A plinth according to claim 8, wherein said one or more peripheral portions of said side wall include at least one pair of spaced apart opposed peripheral wall portions and wherein one of said divider portions extends from about the mid-point of one of said at least one pair of spaced apart opposed peripheral wall portions towards the other one.

10. A plinth according to claim 9 including two divider portions extending towards each other from said at least one pair of spaced apart opposed peripheral wall portions towards each other.

11. A plinth according to claim 1, wherein said one or more peripheral portions of said side wall terminate in an outwardly extending continuous flange having a free edge remote from said platform and said platform has at least one peripheral corner and the side wall adjacent said at least one peripheral corner joins said flange adjacent its free edge.

12. A plinth constructed of plastic material including:
a platform;
a continuous side wall depending from said platform, said side wall including one or more peripheral portions and one or more divider portions, each of said one or more divider portions dividing the platform into at least two load bearing sections and each divider portion including two spaced apart divider wall portions joined by a bottom wall so as to support the load bearing sections of said platform, said platform, said divider wall portions and said bottom wall forming a substantially continuous surface.

* * * * *

UNITED STATES PATENT AND TRADEMARK OFFICE
CERTIFICATE OF CORRECTION

PATENT NO.         : 8,152,129 B2
APPLICATION NO.    : 12/733356
DATED              : April 10, 2012
INVENTOR(S)        : Hermans et al.

It is certified that error appears in the above-identified patent and that said Letters Patent is hereby corrected as shown below:

On the Title page, Item (73) Assignee, please add: --Polyslab International Pty Ltd., Queensland, AU--.

Change Item (76) to read: Item (75)

Signed and Sealed this
Thirty-first Day of July, 2012

David J. Kappos
*Director of the United States Patent and Trademark Office*